(12) United States Patent
Suzuki

(10) Patent No.: US 7,512,376 B2
(45) Date of Patent: Mar. 31, 2009

(54) AUTOMATIC ORIGINAL COVER CLOSER AND OFFICE EQUIPMENT INCLUDING AUTOMATIC ORIGINAL COVER CLOSER

(75) Inventor: Naokazu Suzuki, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 584 days.

(21) Appl. No.: 11/258,332

(22) Filed: Oct. 25, 2005

(65) Prior Publication Data

US 2006/0180972 A1   Aug. 17, 2006

(30) Foreign Application Priority Data

Nov. 17, 2004   (JP)   ............... 2004-333797

(51) Int. Cl.
   *G03G 15/00*   (2006.01)
(52) U.S. Cl. ................ 399/380; 16/239; 16/354; 49/333; 49/334; 49/335; 297/362.11
(58) Field of Classification Search ............... 399/380; 16/239, 354; 49/333, 334, 335; 297/362.11
   See application file for complete search history.

(56) References Cited

U.S. PATENT DOCUMENTS

2002/0089223 A1* 7/2002 Yu ..................... 297/362.11

FOREIGN PATENT DOCUMENTS

JP    56-107268       8/1981
JP    05197039 A  *  8/1993

* cited by examiner

*Primary Examiner*—Anthony H Nguyen
*Assistant Examiner*—Andy L Pham
(74) *Attorney, Agent, or Firm*—Notaro & Michalos P.C.

(57) ABSTRACT

An automatic original cover closer to practically realize an automatic opening and closing function of an original cover, has a hinge part to rotatably support an original cover to the main body of office equipment and a driving part to automatically drive the hinge part. The hinge part includes a mounting member to mount on the main body and a supporting member to support the original cover to be axially supported to this mounting member so as to be rotatable with a rotary shaft via the rotary shaft. The driving part includes a positively and reversely rotatable drive motor and a power transferring mechanism to decelerate and transfer the rotary driving power of this drive motor to a drive shaft. The rotary driving power of the drive motor is transferred to the supporting member via the drive shaft and the rotary shaft, by connecting the rotary shaft to the drive shaft.

7 Claims, 9 Drawing Sheets

(a)

(b)

(c)

(d)

(a)

(b)

(c)

(d)

(a)

(b)

(c)

AUTOMATIC ORIGINAL COVER CLOSER AND OFFICE EQUIPMENT INCLUDING AUTOMATIC ORIGINAL COVER CLOSER

BACKGROUND OF THE INVENTION

1. Field of the Invention

The present invention relates to an automatic original cover closer suitable for use in office equipment such as a copying machine, a printer, a facsimile machine, a scanner and so on, and office equipment including the automatic original cover closer.

2. Description of the Related Art

An original cover is reclosably mounted on the top surface of a main body of office equipment such as a copying machine, a printer, a facsimile machine, a scanner, and so on via an original cover closer. The original cover closer axially supports to be rotatable the original cover reclosably to cover a contact glass mounted on the top surface of the main body with the original cover, and can expose the top surface of the contact glass as well. When the office equipment is not in use, the original cover covers the contact glass which is the top surface of the main body. In this specification, this state is often expressed as a closed state of the original cover. When an original is set on the contact glass, the original cover is opened (shifted upward) to expose (open) the top surface of the contact glass. In this specification, this state is often expressed as an open state of the original cover. After setting the original on the surface of the exposed contact glass, by closing (shifting downward) the original cover to cause the original to come in intimate contact with the contact glass with the original cover, the original is set on the contact glass.

Thus, when the original cover is opened and closed, it is usually carried out manually. However, opening and closing of the original cover manually is sometimes difficult for the aged or a person on a wheel chair. In addition to that, in order to set an original held with both hands, it is sometimes required to dispose of the original once and set it after opening the original cover. Therefore, development of an automatic device to automatically open and close the original cover is demanded. Some of the automatic original cover closer of this kind have been already proposed. As a well-known document, Japanese Patent Application Laid-open No. Sho 56-107268 can be cited. However, there is no automatic original cover closer which is now practically used including this well-known document. Though various reasons for this are conceivable, the main reason is that such an automatic original cover closer needs to have a structure such that it is able to open and close the original cover also manually with a low manufacturing cost, and a simple and compact structure that does not require much space to mount.

SUMMARY OF THE INVENTION

The present invention has been developed to solve the above problem and its object is to provide an automatic original cover closer which can be practically used.

In order to achieve the above-described object, the automatic original cover closer relating to the present invention comprises a hinge part to rotatably support an original cover to a main body of office equipment, and a driving part to automatically drive the hinge part, in which the hinge part includes a mounting member to mount on the main body, and a supporting member to support the original cover to be axially supported to this mounting member so as to be rotatable with a rotary shaft via the rotary shaft. The driving part includes a positively and reversely rotatable drive motor, and a power transferring mechanism to decelerate and transfer the rotary driving power of this drive motor to a drive shaft, so that the rotary driving power of the drive motor is transferred to the supporting member via the drive shaft and the rotary shaft by connecting the rotary shaft and the drive shaft.

According to the present invention, by forming a structure to connect the rotary shaft of the hinge part and the drive shaft of the driving part so that the rotary driving power of the drive motor is transferred to the supporting member via the drive shaft and the rotary shaft, the rotary driving power of the drive motor is transferred to the supporting member to perform rotatable movement of the original cover automatically. Thus, rotation of the original cover can be automatically carried out with little modification in configuration of the hinge part because the driving power of the driving part is transferred to the rotary shaft of the hinge part by connecting shafts. In other words, since rotatable movement of an original cover can be performed automatically using the existing hinge part, practical use of automatic opening and closing of a original cover can be easily realized.

In the automatic original cover closer relating to the present invention, it is desirable that the rotary shaft and the drive shaft be coaxially disposed, and the rotary shaft and the drive shaft are connected in a manner that an end of one shaft is provided with a fitting concave portion and an end of the other shaft is provided with a fitting convex portion to fit into the fitting concave portion without rotation. It is also desirable that the drive motor should be a pulse motor in the automatic original cover closer according to the present invention.

In the automatic original cover closer relating to the present invention, it is also desirable that a lifting member, overlaid on the supporting member, axially supported rotatably by the supporting member at the free end portion thereof, and mounted on the original cover, be provided between the supporting member and the original cover, and a resilient means to rotatably urge the original cover in the direction of opening via the lifting member and to urge the lifting member in a direction to be overlaid on the supporting member, be provided between the mounting member and the supporting member.

In the automatic original cover closer relating to the present invention, it is desirable that an automatic rotary opening mechanism be provided to automatically rotate the original cover in an opening direction by the rotary driving power of the drive motor transferred to the rotary shaft when the original cover is opened from a closed position to a prescribed opening angle.

In the automatic original cover closer relating to the present invention, it is desirable that an automatic rotary closing mechanism be provided to perform rotation of the original cover in the direction of closing manually or by its own weight, when the original cover is at an angle equal to or less than a prescribed closing angle at the time of rotating the original cover automatically in the direction of closing by the rotary driving power of the drive motor transferred to the rotary shaft by driving the drive motor.

In the automatic original cover closer relating to the present invention, it is desirable that the automatic original cover closer be structured such that the drive motor is switched on when the original cover reaches a prescribed opening angle from the closed position of the original cover and the drive motor is switched off at the position of a prescribed closing angle and the closing movement of the original cover thereafter is carried out manually or by its own weight. In the automatic original cover closer relating to the present invention, it is desirable to be structured to perform manual rotational operation of the original cover.

In order to achieve the above-described object, office equipment relating to the present invention is provided with the automatic original cover closer according to the present invention. According to the present invention, similarly to those described above, by connecting the rotary shaft of the hinge part and the drive shaft of the driving part, the rotary driving power of the drive motor is transferred to the supporting member via the drive shaft and rotary shaft, so that rotation of the original cover can be automatically carried out with little modification of the structure of the hinge part. Therefore, practical use of automatic opening and closing of the original cover 3 can be easily realized.

As explained above, according to the automatic original cover closer relating to the present invention, since the rotary driving power of the drive motor is transferred to the supporting member via the drive shaft and rotary shaft by connecting the rotary shaft of the hinge part and the drive shaft of the driving part, rotation of the original cover can be automatically carried out with little modification of the structure of the hinge part so that practical use of automatic opening and closing of the original cover can be easily realized.

BRIEF DESCRIPTION OF THE DRAWINGS

FIGS. 2A to 2E are views showing an example of an automatic original cover closer relating to the present invention, in which FIG. 2A is a perspective view, FIG. 2B is another perspective view, FIG. 2C is a front view, FIG. 2D is a side view, and FIG. 2E is a plan view;

FIGS. 3A to 3D are views showing an example of a hinge part relating to the present invention, in which FIG. 3A is a perspective view, FIG. 3B is a plan view, FIG. 3C is a side view and FIG. 3D is a front view;

FIGS. 8A to 8D are views showing an example of a driving part relating to the present invention, in which FIG. 8A is a plan view, FIG. 8B is a perspective view, FIG. 8C is a front view, and FIG. 8D is a side view; and FIGS. 9A, 9B, and 9C are views showing another example of the driving part relating to the present invention, in which FIG. 9A is a plan view, FIG. 9B is a front view, and FIG. 9C is a side view.

DETAILED DESCRIPTION OF THE PREFERRED EMBODIMENT(S)

Hereinafter, an automatic original cover closer relating to the present invention will be explained in detail with reference to attached drawings.

Figure 1:
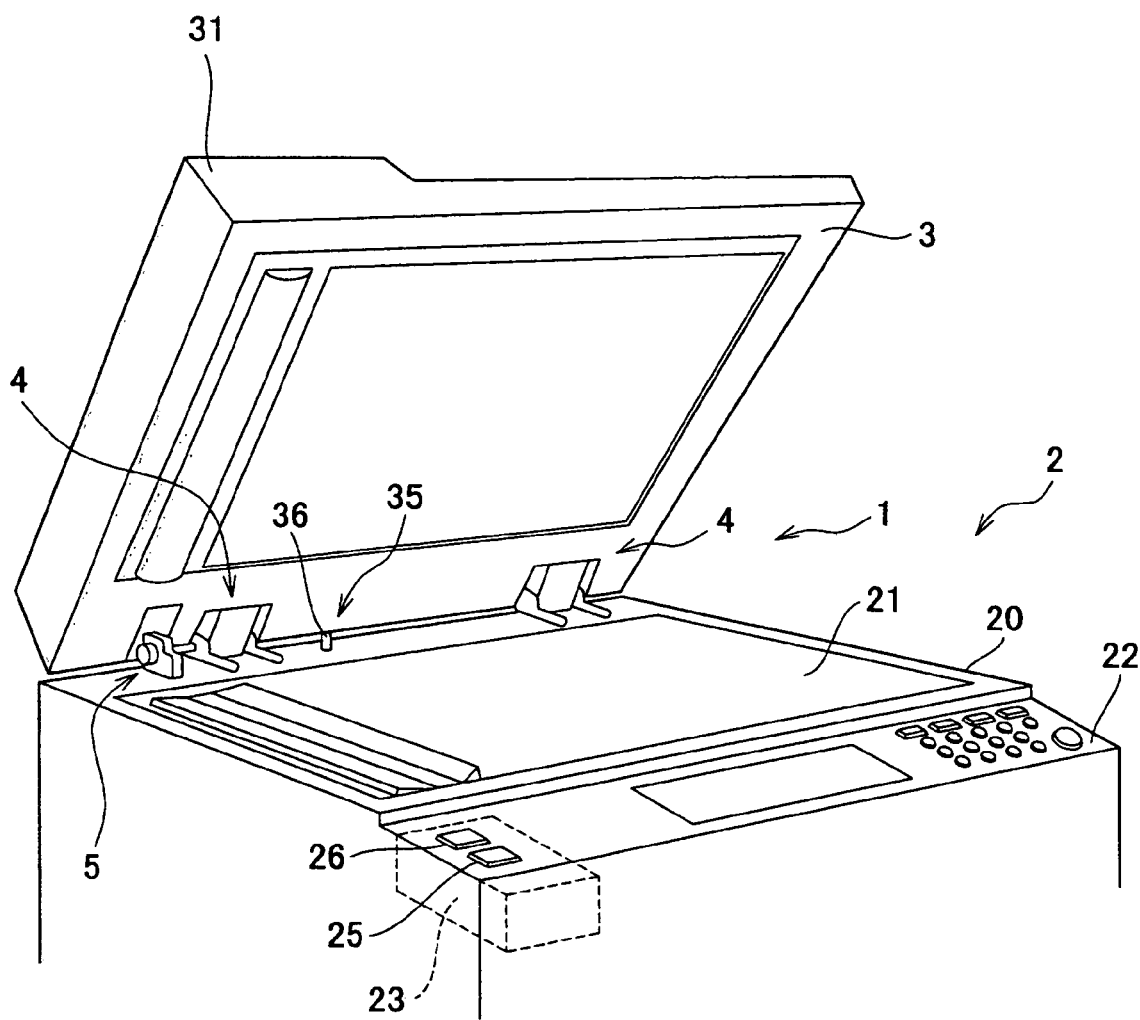
FIG. 1 is a schematic perspective view showing an example of office equipment. relating to the present invention.
Figure 2:
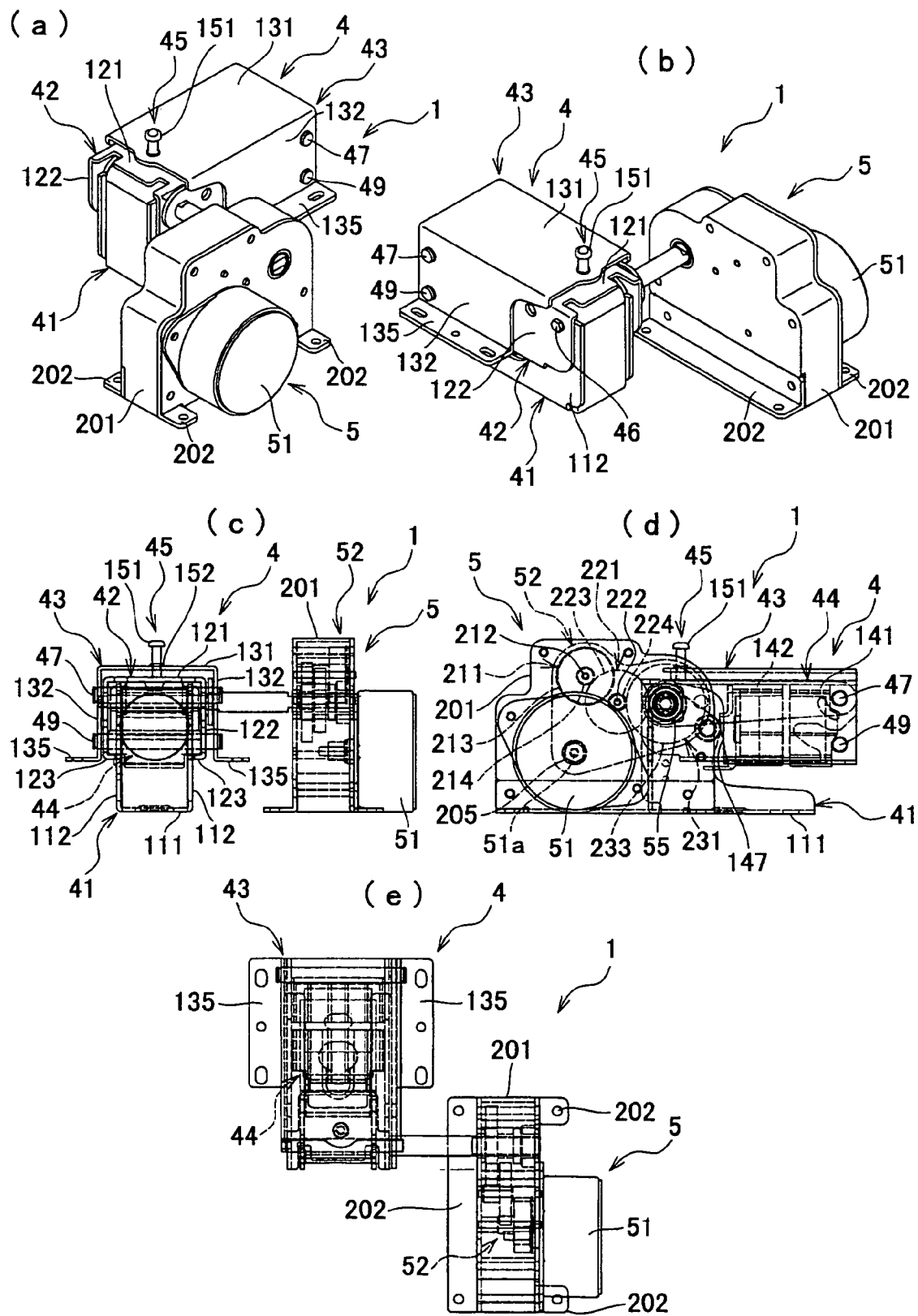
Figure 3:
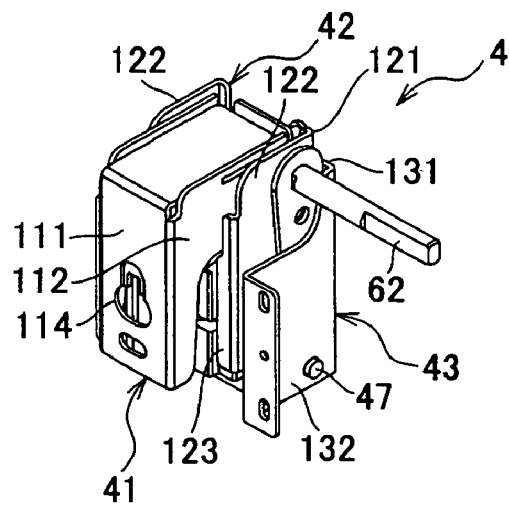
Figure 3:
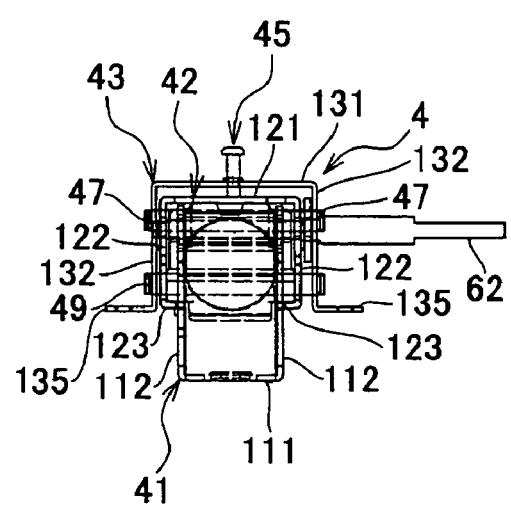
Figure 3:
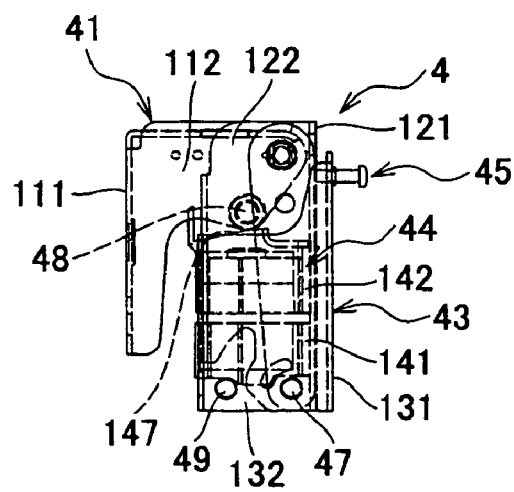
Figure 3:
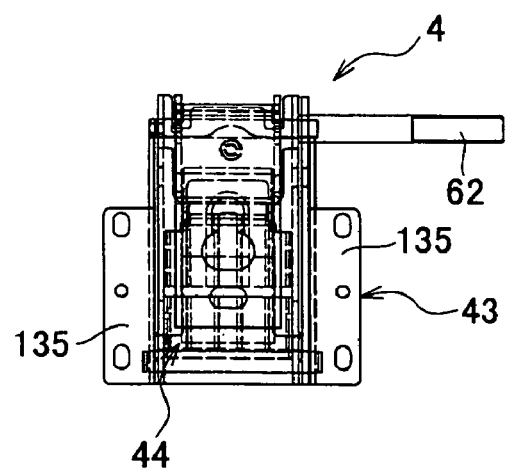

FIG. 1 is a view showing an example of office equipment relating to the present invention. FIG. 2 is a view showing an example of an automatic original cover closer relating to the present invention. FIG. 3A to FIG. 7 are views showing an example of a hinge part relating to the present invention. FIG. 8A to FIG. 8D are views of an example of a driving part relating to the present invention. The automatic original cover closer relating to the present invention is to rotatably attach the original cover 3 to a rear end portion of a main body 20 of the office equipment 2 as shown in FIG. 1. The office equipment 2 is not limited to, and, for instance, a copying machine, a printer, a facsimile machine, a scanner and so on can be cited as usable office equipment, and, in particular, a copying machine is preferable as the office equipment 2. The original cover 3 is provided with, for instance, an original automatic feeder 31.

As shown in FIG. 1 and FIGS. 2A to 2E, the automatic original cover closer 1 includes a hinge part 4 to rotatably support the original cover 3 to the main body 20 of the office equipment 2, and a driving part 5 to automatically open and close the original cover 3, and is structured in a manner that driving power of a driving part 5 is transferred to the hinge part 4 via a drive shaft 55 and a rotary shaft 46 by connecting the rotary shaft 46 of the hinge part 4 and the drive shaft 55 of the drive part 5.

The hinge part 4 axially supports to be rotatable the original cover 3 to the main body 20 of the office equipment 2, and usually supports the original cover 3 with two hinge parts 4. The two hinge parts 4 can be the same or different from each other so far as they can rotatably support the original cover 3 to the main body 20. In an example shown in FIG. 1, an example to rotatably support the original cover 3 to the main body 20 using nearly the same hinge parts as the two hinge parts 4.

As shown in FIG. 2A to FIG. 5, the hinge part 4 preferably includes: a mounting member 41 attached to the main body 20; a supporting member 42 axially supported to be rotatable to the mounting member 41 together with the rotary shaft 46 via the rotary shaft 46; a lifting member 43 overlapped with the supporting member 42, axially supported to be rotatable to a free end of the supporting member 42, and attached to the original cover 3; and a resilient means 44 disposed between the mounting member 41 and the supporting member 42, rotatably urging the original cover 3 in the direction of opening, and urging the lifting member 43 in the direction overlapping with the supporting member 42. It should be noted that the opening direction in the present invention is referred to as a direction in which the original cover 3 is leaving from contact glass 21 when the original cover 3 is moved rotatably via the hinge part 4.

The mounting member 41 mainly includes a bottom plate 111 detachably attached to the main body 20, and two side plates 112, 112 extending from both end portions of the bottom plate 111 in the orthogonal direction (including nearly orthogonal direction) to the bottom plate 111 respectively, and opposing to each other.

The bottom plate 111 is formed in a nearly rectangular shape and an mounting hole 114 is provided for attachment of the bottom plate to the main body 20 with a machine screw or the like. The side plate 112 is formed substantially L-shaped with the bottom plate 111 and a shaft hole (not shown) through which the rotary shaft 46 is inserted is arranged in the tip portion (upper portion) thereof. A fast pin hole (not shown) is provided at a position on the bottom plate 111 side (downward) from the shaft hole of the side plate 112, and urged to a little inner side (toward the front). Fast pins 48 are inserted in the fast pin holes of both side plates 112. The fast pins 48 are pressure bearing members upon which a first end portion of a resilient means 44 to be described later, or an outside surface of the bottom of a second slider to be described later abuts. The pressure bearing member is not limited to a pin such as the fast pin 48 and so on, but can be a roller, for instance a pressure bearing roller.

The supporting member 42 includes a top plate 121 and both side plates 122, 122 extending in a direction perpendicular (including direction nearly perpendicular) to the top plates 121 from both side end portions of the top plate 121 respectively, and opposing to each other, and guide plates 123 formed by bending the tip portions of the side plates 122 into a 90° angle in the direction opposing to each other.

The end portions (rear end portions) of both side plates 122, 122, are provided with hinge pin holes (not shown), through which hinge pins 47 are inserted, and at the same time, are provided with notched portion 124, into which operation pins 49 to be described later are put. Shaft fixing holes (not shown) are provided in the other end portions (front end portions) of both side plates 122 and 122. The supporting member 42 is rotatably connected to the mounting member 41 via the rotary shaft 46, by aligning coaxially the shaft fixing holes of both side plates 122, 122 and the shaft hole of the mounting member 41, and the rotary shaft 46 being inserted through these holes to be fixed to the shaft fixing hole.

The lifting member 43 is formed substantially U-shaped so as to cover the supporting member 42 with a top plate 131 detachably fixed to a rear end side of the original cover 3 using a machine screw or the like, and both side plates 132, 132 extending from both side portions of the top plate 131 in the direction orthogonal (including nearly orthogonal) to the top plate 131 respectively and opposing to each other. Flanges 135 and 135 to fix the lifting member 43 to the original cover 3 are provided on both side plates 132 and 132, respectively.

A hinge pin insertion hole (not shown) is provided at a portion on the top plate 131 side from the center of an end portion (a rear end portion) of the lifting member 43, and at the same time, an operation pin hole (not shown) through which an operation pin 49 is inserted is provided at a portion on the other end side from the hinge pin insertion hole and on the opposite side of the top plate 131 from the center. The operation pin 49 is inserted through the operation pin hole and fixed in both side plates 132 and 132. The hinge pin insertion hole in both side plates 132 and 132 of the lifting member 43 and the hinge pin holes of both side plates 122 and 122 of the supporting member 42 are coaxially aligned, and the hinge pin 47 is inserted through these holes, thereby rotatably connecting the lifting member 43 and the supporting member 42 using the hinge pin 47 as a shaft.

It is preferable that a horizontal position adjusting means 45 to adjust a horizontal position of the original cover 3 is provided near the rear end of the top plate 131. The horizontal position adjusting means 45 includes an adjustment screw 151 and a fixing nut 152 provided, for instance, near rear end of the top plate 131 in the center along the width (including nearly central portion). The fixing nut 152 is fixed to the top plate 131, the adjustment screw 151 is screwed to the fixing nut 152, and at the same time, the tip of the adjustment screw 151 abuts on the top plate 121 of the supporting member 42 so that a distance between the supporting member 42 and the lifting member 43 is adjusted by adjustment of the adjustment screw 151, thereby adjusting the horizontal position of the original cover 3.

The resilient means 44 rotatably urges the original cover 3 in the direction of opening and at the same time urges the lifting member 43 in the direction to overlap with the supporting member 42, and when the original cover 3 is below a prescribed opening angle, urging force to urge the original cover 3 is smaller than the moment of the original cover 3. The resilient means 44 includes, for instance, a pair of sliders 141 and 142 fitted into the supporting member 42 and a compression coil spring (not shown) which is a urging member provided in the pair of sliders 141 and 142. Note that an opening angle in the present invention is the angle of the original cover 3 to the surface of the contact glass 21 which is the top surface of the main body 20. A prescribed opening angle in the present invention is referred to, for instance, as an angle at which the urging force to urge the original cover by the resilient means 44 becomes smaller than the moment of the original cover 3.

The pair of sliders 141 and 142 are formed in a cylindrical shape with a bottom having a rectangular cross section, are slidably fitted to the supporting member 42 respectively in a manner that respective apertures are opposed to each other. A compression coil spring is housed in the pair of sliders 141 and 142. The pair of sliders 141 and 142 are formed in a length to be fitted in the supporting member 42 when the bottom plate 111 of the mounting member 41 and the supporting member 42 (top plate 121) are substantially in parallel (for instance, the original cover 3 is brought into intimate contact with the contact glass 21 on the top surface of the main body 20 (at the time of intimate contact of the original cover.

The number of the compression coil springs is not limited, one, two or more will be acceptable, and for instance, one spring is provided to urge the pair of sliders 141 and 142 away from each other. The compression coil spring rotatably urges the original cover 3 in the direction of opening, and when the original cover 3 is below the prescribed opening angle (for instance, 20° (including around 20°)), the urging force urging to the original cover 3 is smaller than the moment of the original cover 3).

A closed surface which is an outer surface of the bottom portion of the slider (first slider) 141 on the tip side presses the operation pin 49 with urging force of the compression coil spring so as to overlap the supporting member 42 and the lifting member 43. In other words, the tip of the adjustment pin 151 of the top plate 131 of the lifting member 43 abuts on the top plate 121 of the supporting member by urging force of the compression coil spring, and the top plate 121 of the supporting member 42 and the top plate 131 of the lifting member 43 are overlapped or substantially overlapped with each other.

Figure 6:
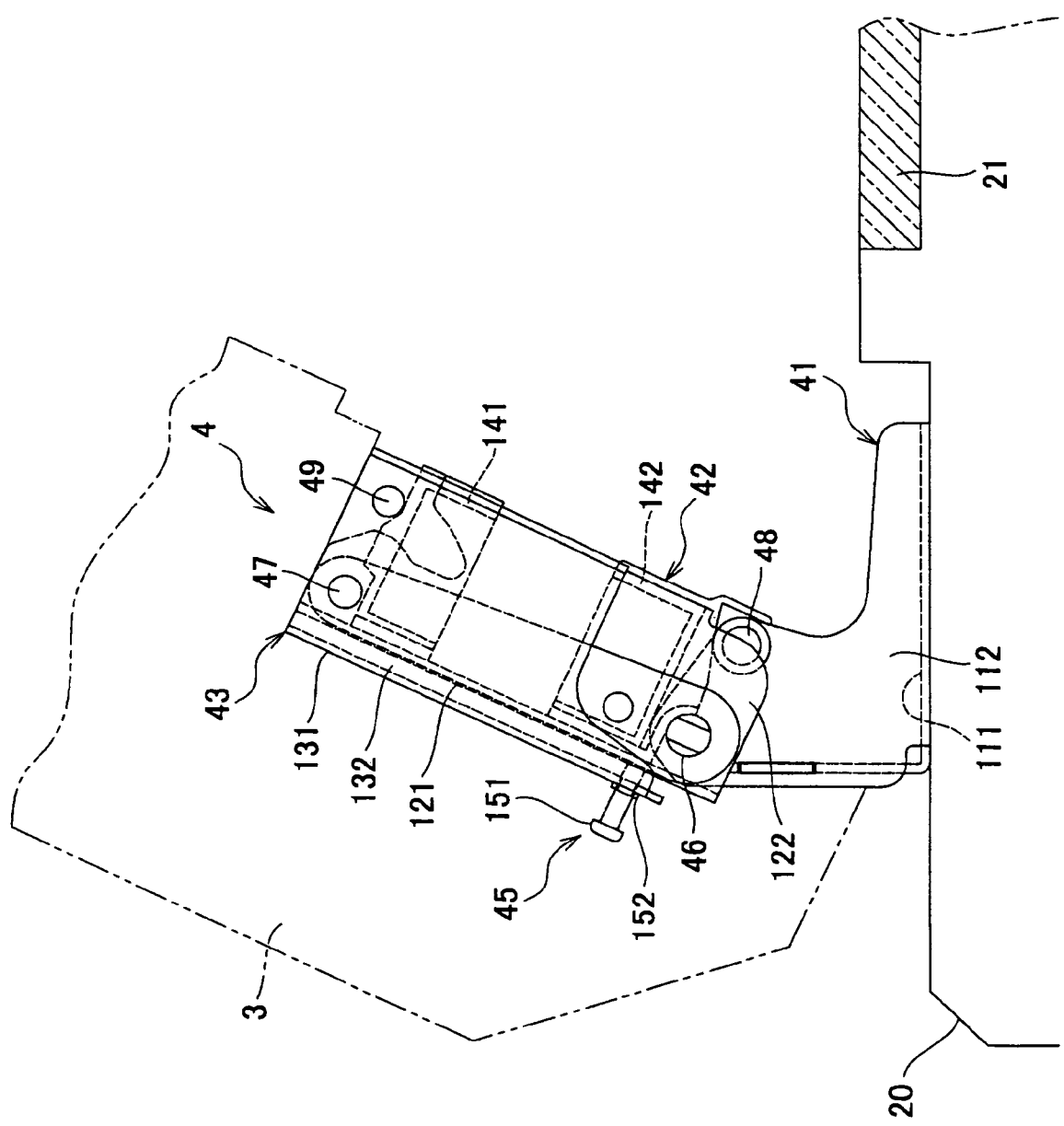
FIG. 6 is a side view showing an example of the hinge part relating to the present invention.

An inclined portion 147 is provided on an outer surface of the bottom portion of the slider (second slider) 142 on the rear end side. The inclined portion 147 is a spot to abut on the fast pin 48. In other words, when the original cover 3 is rotated in the direction of opening via the rotary shaft 46 from a state that the original cover 3 is brought into intimate contact with the contact glass 21 on the top surface of the main body 20, namely a state of the original cover 3 being in a closed position (refer to FIG. 4), the spot abutting on the fast pin 48 slides along the inclined portion 147, and the second slider 142 is pressed to slide toward the rear. end side inside the supporting member 42 by the compression coil spring so that the compression coil spring gradually expands. As shown in FIG. 1 and FIG. 6, when the original cover 3 reaches a maximum usable opening angle, the rotating movement is controlled by an original cover rotation movement controller (not shown).

The maximum usable opening angle in the present invention is an angle between the surface of the contact glass 21 which is the top surface of the main body 20 and the original cover 3, and the angle of the rotation movement in the direction of opening of the original cover is controlled. This maximum usable opening angle is not particularly limited but preferably from 60° (including around 60°) to 70° (including around 70°), and in the example shown in FIG. 6 is 65° (including around 65°).

The driving part 5 automatically drives the hinge part 4 to automatically open and close the original cover 3. The driving part 5 may be provided near the two hinge parts 4 of the main body 20. However, as shown in FIG. 1, one piece of the driving part is provided only near the hinge part 4 axially supporting rotatably the original cover 3, of which center of gravity is inclined due to attachment of the original automatic feeder 31, to automatically drive the hinge part 4. As shown in FIGS. 2A, 2B, 2C, 2D, 2E, and FIGS. 8A, 8B, 8C, 8D, the driving part 5 includes a drive motor positively and reversibly rotatable, and a power transferring mechanism 52 to reduce in speed and transfer the rotary driving power of this drive motor to the drive shaft 55, and is configured to perform rotational operation of the original cover 3 manually without using a drive motor.

Although the drive motor is not limited to a specific type so far as it can automatically drive the hinge part 4, for instance, a pulse motor 51 or the like is desirable. The pulse motor 51 is detachably attached on a side surface of a drive case 201. The drive case 201 is detachably attached to the main body 20 via a flange 202 with a machine screw, a screw member or the like. The power transferring mechanism 52 is provided in the drive case 201.

The power transferring mechanism 52 is not limited in particular, so far as it can reduce the rotary driving power of the pulse motor 51 and transfer it to the drive shaft 55, and includes three of first, second, and third reduction gears 211, 221, and 231, for instance. Specifically, a drive pulley 205 is fixed to a rotary shaft 51a of the pulse motor 51. The first reduction gear 211 includes a first supporting shaft 212 rotatably supported by the drive case 201, a driven pulley 213 provided on the first supporting shaft 212, and a small gear 214 provided on the first supporting shaft 212 and is smaller in diameter than that of the driven pulley 213. The second reduction gear 221 includes a second supporting shaft 222 rotatably supported by the drive case 201, a large gear 223 provided on the second supporting shaft 222, and a small gear 224 provided on the second supporting shaft 222 and is smaller in diameter than that of the large gear 223. The third reduction gear 231 includes a third supporting shaft rotatably supported by the drive case 201, and a large gear 233 provided on the third supporting shaft, and the third shaft is the drive shaft 55.

A timing belt 208 is put between the drive pulley 205 of the rotary shaft 51a of the pulse motor 51 and the driven pulley 213 of the first reduction gear 211, the small gear 214 of the first reduction gear 211 and the large gear 223 of the second reduction gear 221 are engaged with each other, and the small gear 224 of the second reduction gear 221 and the large gear 233 of the third reduction gear 231 are engaged with each other. The rotary driving power of the pulse motor 51 is transferred to the first reduction gear 211 via the timing belt 208 to be reduced in speed and transferred from the first reduction gear 211 to the drive shaft 55 which is the third supporting shaft of the third reduction gear 231 via the second reduction gear 221. The drive shaft 55 and the rotary shaft 46 are connected to each other.

It is desirable that the a clutch mechanism (not shown) to release transfer of the rotary driving power of the pulse motor 51 to the rotary shaft 46 be provided in the power transferring mechanism 52. The clutch mechanism is not limited in particular so far as it can release transfer of the rotary driving power to the rotary shaft 46, and a mechanical type can be used.

Connection of the rotary shaft 46 and the drive shaft 55 is not limited in particular, and an end portion of the rotary shaft 46 or/and an end portion of the drive shaft 55 may be extended and connected to each other. Connection of the shafts may be performed by arranging the rotary shaft 46 and the drive shaft 55 coaxially, and providing a fitting concave portion on the end portion of one shaft and a fitting convex portion on the end portion of the other shaft so as to fit to the fitting concave while rotation being controlled by the fitting concave. The shafts may be connected by mounting gears or pulleys on the rotary shaft 46 and the drive shaft 55, engaging the gears or using timing belts. Though the drive part 5 is disposed on the rear portion of the main body 20, it is also adoptable to dispose it in the main body 20.

Concretely, when the mounting member 41 and the drive case 201 are attached to the main body 20 in a manner that the rotary shaft 46 and the drive shaft 55 are aligned coaxially, a fitting concave portion 61 is provided on the end portion of the drive shaft 55 on the side opposing to the rotary shaft 46. The fitting concave portion 61 is formed, for instance, in a substantially elliptical shape by cutting each opposing peripheral circular surface in parallel. It is adoptable that an end portion of the rotary shaft 46 on the side opposite to the drive shaft 55 is extended on the same axis (including substantially the same axis) with the drive shaft 55, and a substantially elliptic fitting convex portion 62 to engage with the fitting concave portion 61 is provided at the end of this extended portion, to connect by engaging the rotary shaft 46 with the drive shaft 55.

A controller 23 is provided on the main body 20 as shown in FIG. 1. The controller 23 serves to control the pulse motor 51 and the like when rotating the original cover 3 in the direction of opening or in the direction of closing. Note that closing direction in the present invention is referred to as closing direction of the original cover 3 near the contact glass 21 when rotating the original cover 3 via the hinge part 4. The controller 23 is provided with an automatic rotary opening function to automatically rotate the original cover 3 in the direction of opening by, for instance, performing pushing manipulation of an automatic open switch 25 for the original cover provided on an operation control panel 22 of the main body 20 to drive the pulse motor 51.

The automatic rotary opening function may immediately drive the pulse motor 51 and automatically rotate the original cover 3 at a closed position in the direction of opening by, for instance, performing pushing manipulation of the automatic open switch 25 for the original cover, but it is desirable that the original cover 3 should not automatically rotate in the direction of opening immediately after performing, for instance, pushing manipulation of the automatic open switch 25 for the original cover, but after the original cover 3 is rotated manually to a prescribed opening angle in the direction of opening, the pulse motor 51 is driven to automatically rotate the original cover 3 in the direction of opening so that the original cover 3 is positioned at the maximum usable opening angle (including substantially maximum usable opening angle). In other words, it is desirable that when the original cover 3 reaches a prescribed opening angle from a closed position, the pulse motor 51 is switched on so that the original cover 3 automatically rotates at the maximum usable opening angle (including substantially maximum usable opening angle). By configuring as above, it becomes possible to rotate the original cover 3 in the direction of opening without application of large torque, which makes it possible to miniaturize the pulse motor 51 and the power transferring mechanism 52.

The controller 23 is provided with an automatic close rotating function to automatically rotate the original cover 3 at an opening position in the direction of closing by, for instance, performing pushing manipulation of an automatic close switch 26 for the original cover provided on the operation control panel 22 of the main body 20 to drive the pulse motor 51. It should be noted that the opening position in the present invention is referred to as positioning the original cover 3 at a position where an original is mountable on the contact glass 21, and referred to as a case of positioning the original cover 3 at the maximum usable opening angle (including substantially maximum usable opening angle).

The automatic rotary closing function is not limited so far as it can automatically rotate the original cover 3 from the opening position to the closed position. It is desirable to rotate the original cover 3 in the closed direction manually or by its own weight by suspending driving of the pulse motor 51 or stopping the transfer of the rotary driving power from the pulse motor 51 to the rotary shaft 46 by activating the clutch mechanism, when the original cover 3 is less than a prescribed closing angle at the time of automatically rotating the original cover 3 in the direction of closing. This automatic rotary closing function is a first automatic rotary closing function. In other words, when the original cover 3 exceeds a prescribed closing angle, at the time of automatically rotating the original cover 3 in the direction of closing, the pulse motor 51 is switched off to perform closing movement of the original cover 3 manually or by its own weight.

It should be noted that the closing angle in the present invention is referred to as an angle of the original cover 3 to the surface of the contact glass 21 which is the top surface of the main body 20, which is the same as the opening angle. However, when the original cover 3 is rotated in the direction of closing, an angle of the original cover 3 to the surface of the contact glass 21 is, for convenience' sake, sometimes referred to as a closing angle. A prescribed closing angle in the present invention is not limited so far as it is an angle equal to or less than the aforementioned prescribed opening angle, for instance, it is 15° (including around 15°).

Furthermore, it is desirable that a fluid damper device be provided in the compression coil spring. When the original cover 3 is rotated in the direction of closing, the fluid damper device works to reduce a rotating speed of the original cover 3 only in the case of equal to or less than the prescribed closing angle of the original cover 3 (for instance, equal to or less than 10° or so). As the fluid damper device, an oil damper device and the like can be cited for instance.

As an automatic rotary closing function, when the original cover 3 is equal to or less than a prescribed closing angle, the rotational movement of the original cover 3 in the direction of closing is performed neither manually nor by its own weight, but the rotating speed of the original cover 3 in the direction of closing may be adjusted to a lower speed to minimize impact of the original cover 3 on the main body 20, and have the original cover come in intimate contact with the main body 20 without being suspended. This automatic rotary closing function is a second automatic rotary closing function. The second automatic rotary closing function preferably controls the pulse motor 51 so as to suspend rotational movement of the original cover 3 in the direction of closing when the original cover 3 comes in intimate contact with the main body 20 according to signals from an open/close sensor, an angle detection sensor, or the like.

The open/close sensor 35 is disposed in the vicinity of, for instance, the hinge part 4 of the main body 20 to detect whether or not the original cover 3 is in the opening position or in the closing position. As the open/close sensor, either a non-contact type sensor or a contact type sensor is usable, and in the shown example, it is a contact-type sensor. The contact-type open/close sensor 35 sends an electric signal to establish an opening position when a contact 36 urged in the protruding direction protrudes from the main body 20, and sends an electric signal to make it a closing position when the original cover 3 comes in intimate contact with the main body 20, and the contact 36 is accommodated in the main body 20 against the urging force due to the main body 20.

Figure 9:
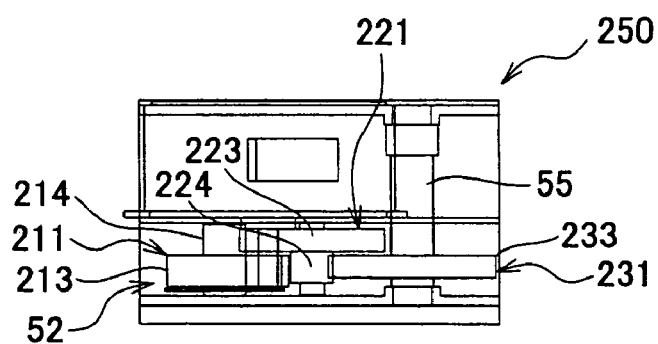
Figure 9:
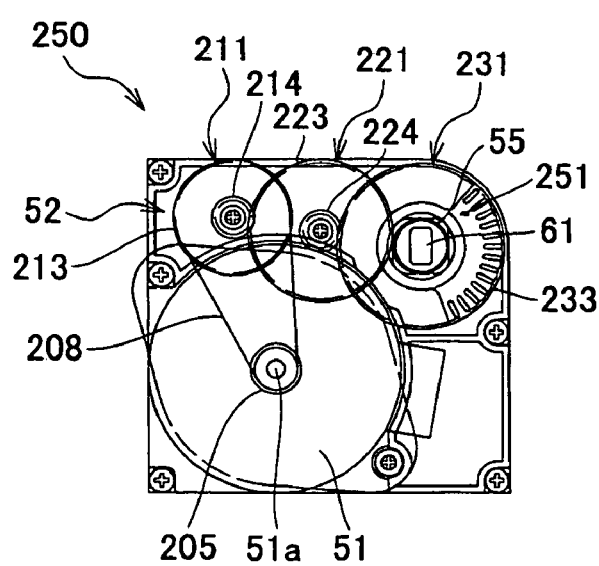
Figure 9:
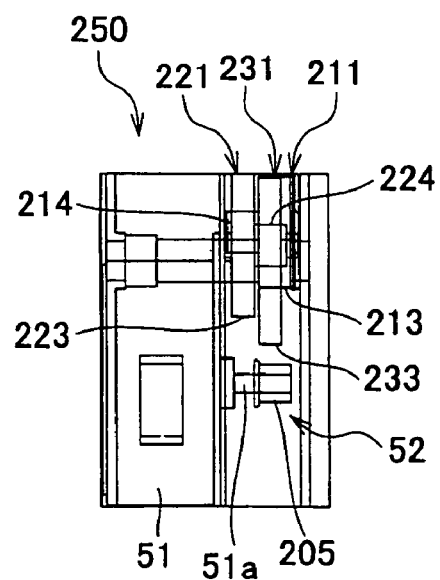

An angle detection sensor is provided on, for instance, the drive shaft 55 to detect the angle of the drive shaft 55, and this detection value makes it possible to detect an angle of the original cover 3 to the main body 20. For instance, an angle detection sensor utilizing an encoder can be cited as the angle detection sensor, and as shown in FIGS. 9A, 9B, and 9C, an encoder 251 is disposed on a side surface of a large gear 233 of a third speed reduction gear 231 of a driving part 250 to detect an angle of the drive shaft 55 so that opening and closing of the original cover 3 can be detected for instance.

It is desirable that a suspending function to suspend driving of the pulse motor 51 be given to the automatic rotary opening function, the first and the second automatic rotary closing function, when a large torque which is different from a torque to rotate the original cover 3 is generated in the case of automatically rotating the original cover 3 in the direction of opening or in the direction of closing. As a means to detect a torque, a torque detection sensor may be provided on the drive shaft 55, the rotary shaft 46 or the like, or the suspension function may be structured so as to suspend driving of the pulse motor 51 in response to the generation of a large amount of torque when the pulse of the pulse motor 51 and the angle of the drive shaft 55 obtained from the angle detection sensor are compared and it is found that the angle of the drive shaft 55 has deviated from the supposed angle of the drive shaft 55 obtained from the pulse of the pulse motor 51.

It is desirable that a function be provided to ensure closure in the controller 23. The function to prevent forgetting to close is, for instance, to automatically rotate the original cover 3 in the direction of closing because the original cover 3 is forgotten to be closed when the original cover 3 is recognized to be still at an open position after a prescribed period of time based on a signal from the open/close sensor 35, angle detection sensor, and the like. Thus, by providing the function to prevent forgetting to close, it is possible to prevent forgetting to close the original cover 3.

It is desirable to provide an auxiliary function to generate auxiliary force in the controller 23 when the original cover 3 is rotated in the direction of opening or in the direction of closing at the time of manual operation to open or close the original cover 3. The auxiliary function is, for instance, to assist the original cover 3 to rotate when the original cover 3 arrives at a prescribed angle based on a signal of the angle detection sensor at the time of rotating of the original cover 3 in a state that the automatic open switch 25 for the original cover or the automatic close switch 26 for the original cover is not operated. When the original cover 3 rotates in the direction of closing, the auxiliary function especially in close rotating desirably possesses a function to drive the pulse motor 51 to rotate the original cover 3 at a low speed at the time of prescribed closing angle or less (for instance, around 10° or less) of the original cover 3. According to the structure having the auxiliary function thus configured, manual rotating of the original cover can be easily performed.

When the controller 23 drives the pulse motor 51, the rotary driving power of the pulse motor 51 is transferred to the rotary shaft 46, and when it does not drive the pulse motor 51, a clutch mechanism may be controlled to release transfer of the rotary driving power of the pulse motor 51 to the rotary shaft.

An operation of the automatic original cover closer relating to the present invention will be explained hereinafter.

Figure 4:
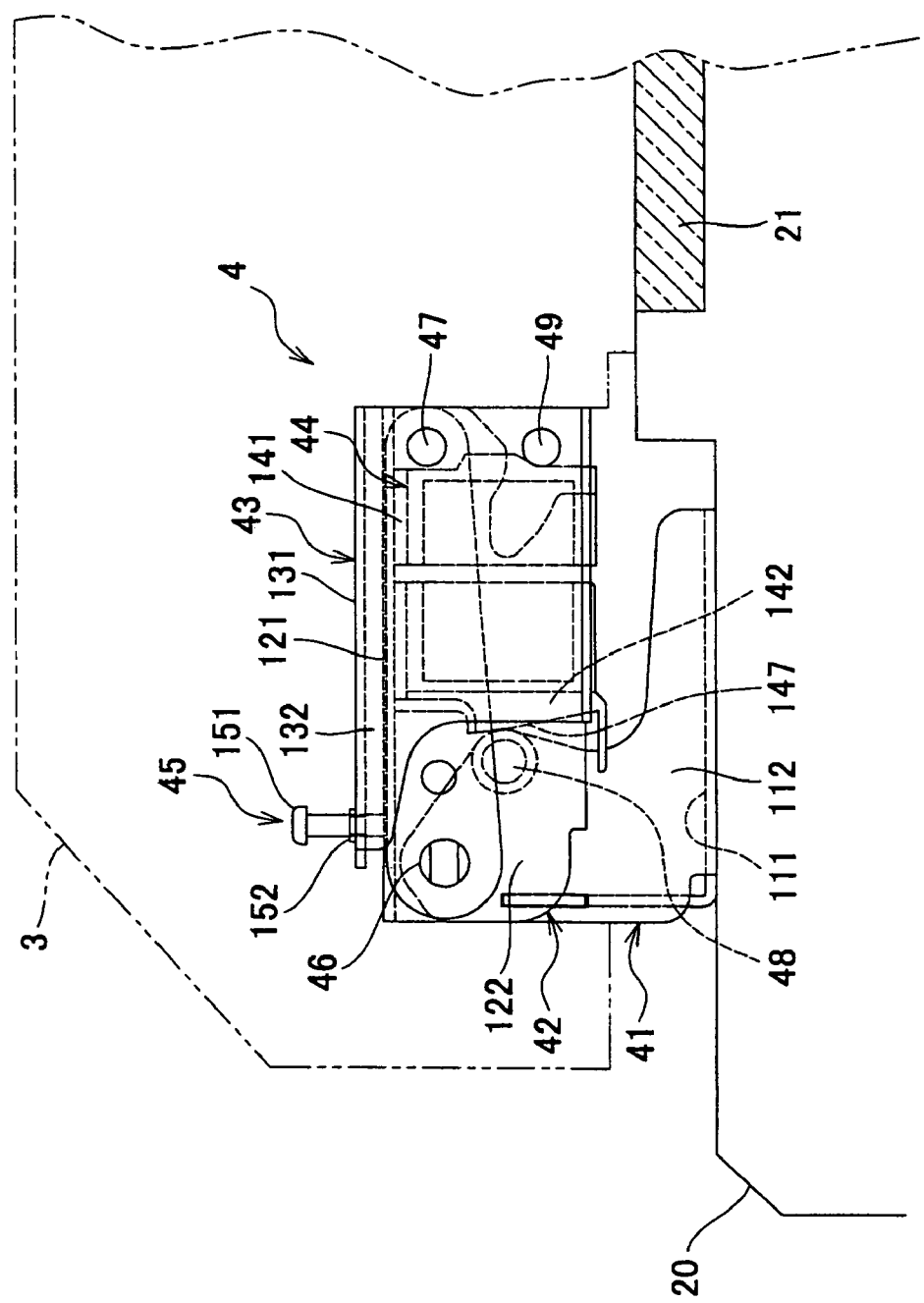
FIG. 4 is a side view showing an example of the hinge part relating to the present invention.

When the main body 20 of the office equipment 2 is not in use, the original cover 3 is in a closed position being in intimate contact with the contact glass 21 of the main body 20 as shown in FIG. 4. In order to manually open the original cover 3 for placing the original on the surface of the contact glass 21, the original cover 3 is lifted upward, holding a gripping part provided in the front of the original cover 3 (an end opposite a place where the hinge part 4 is amounted or in the vicinity thereof). Then, the original cover 3 is opened rotating together with the rotary shaft around the rotary shaft 46 to expose the contact glass surface in the outside as shown in FIG. 1 and FIG. 6, and the original cover 3 is placed in the opened position. Thus, when the original cover 3 is opened in the direction of opening, since the original cover 3 is urged to rotate in the direction of opening by urging force of the compression coil spring, it is possible to open the original cover 3 in the direction of opening without feeling its weight.

Figure 5:
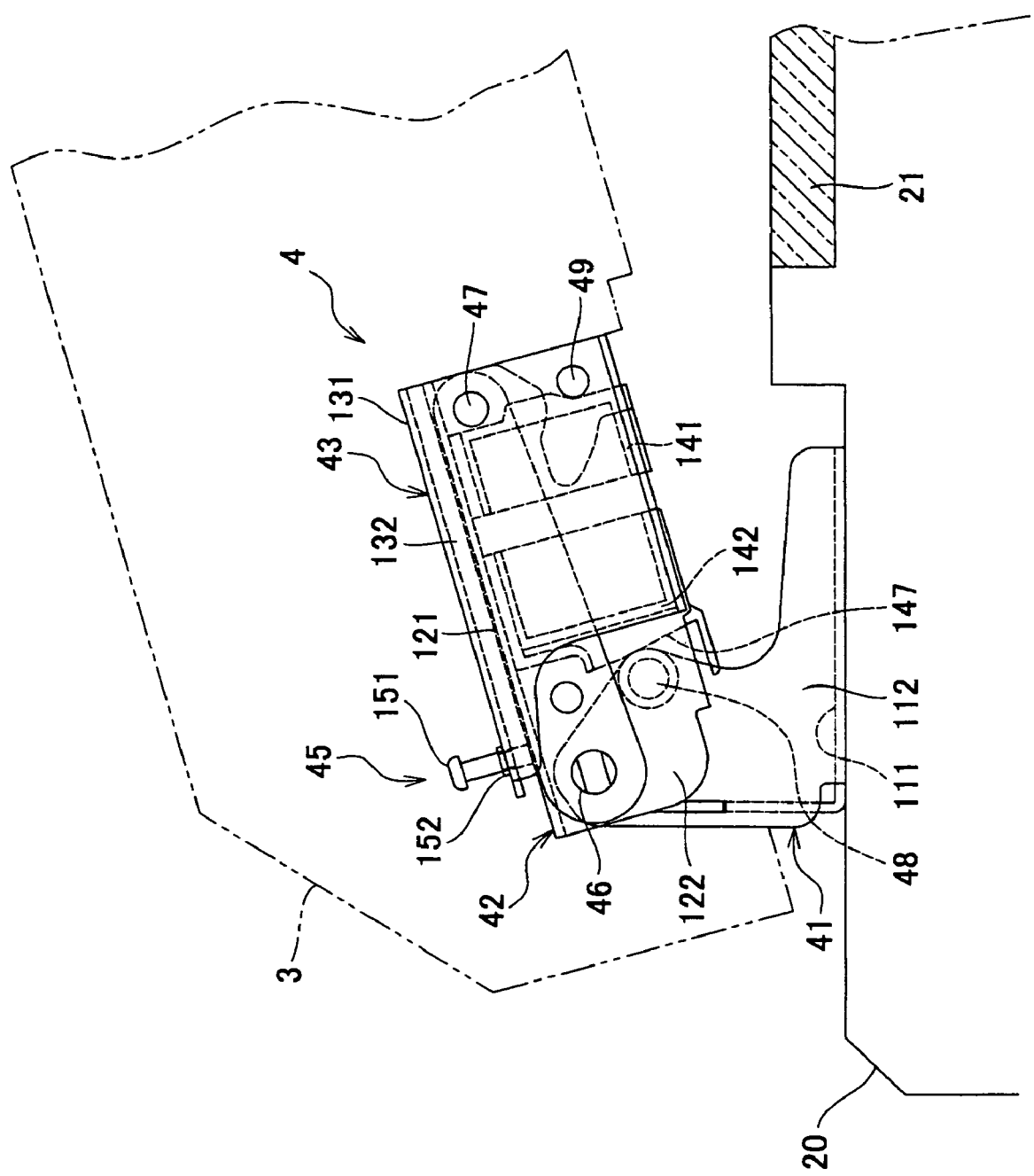
FIG. 5 is a side view showing an example of the hinge part relating to the present invention.

When the original cover 3 is automatically rotated in the direction of opening, the original cover automatic open switch 25 performs, for instance, pushing manipulation. After operating the original cover automatic open switch 25, the pulse motor 51 immediately drives or when the original cover 3 is manually rotated in the direction of opening to a prescribed open angle as shown in FIG. 5, the pulse motor 51 is started driving. By driving the pulse motor 51, the rotary driving power of the pulse motor 51 is transferred to the drive shaft 55 via the power transferring mechanism 52, and it is transferred from the drive shaft 55 to the rotary shaft 46 to automatically rotate the original cover 3 in the direction of opening, and the contact glass surface is exposed in the outside and the original cover 3 is placed in the opening position.

After an original is placed on the surface of the exposed contact glass 21, when the lifted original cover 3 is manually pulled down, the original cover 3 is rotated in the direction of closing, and then the original cover 3 rotates around the rotary shaft 46 in a direction to come into contact with the contact glass 21 (shifts downward). At this time, by urging force of the compression coil spring, the tip of the adjustment screw 151 of the top plate 131 of the lifting member 43 is kept in a abutting state with the top plate 121 of the supporting member 42, in other words, without rotating of the original cover 3 (lifting members 43 and 53) around the hinge pin 47, the original cover 3 rotates downward around the rotary shaft 46.

Thus, when the original cover 3 rotates in the direction of closing, though a little force is required to confront an urging force of the compression coil spring at first, when the closing angle of the original cover 3 is, for instance, equal to 20° or less (including around 20°), since the moment of the original cover 3 becomes larger than the urging force to urge the original cover 3 by the compression coil spring, the original cover 3 can easily rotate. At this time, the rotating speed in the direction of closing of the original cover 3 becomes faster, but the rotating speed of the original cover 3 is reduced by the fluid damper device when the closing angle of the original cover 3 is, for instance, 10° (including around 10°). As a result, since the rotating speed of the original cover 3 is controlled by the fluid damper 3, the original cover 3 does not collide with the contact glass 21 vigorously. When the fluid damper device is not provided, by connecting the drive shaft 55 and the rotary shaft 46 so that the rotary power of the rotary shaft 46 is transferred to the power transferring mechanism, the pulse motor 51, and the like, the rotating speed of the original cover 3 is reduced. Therefore, the original cover 3 does not collide with the contact glass 21 vigorously.

Figure 7:
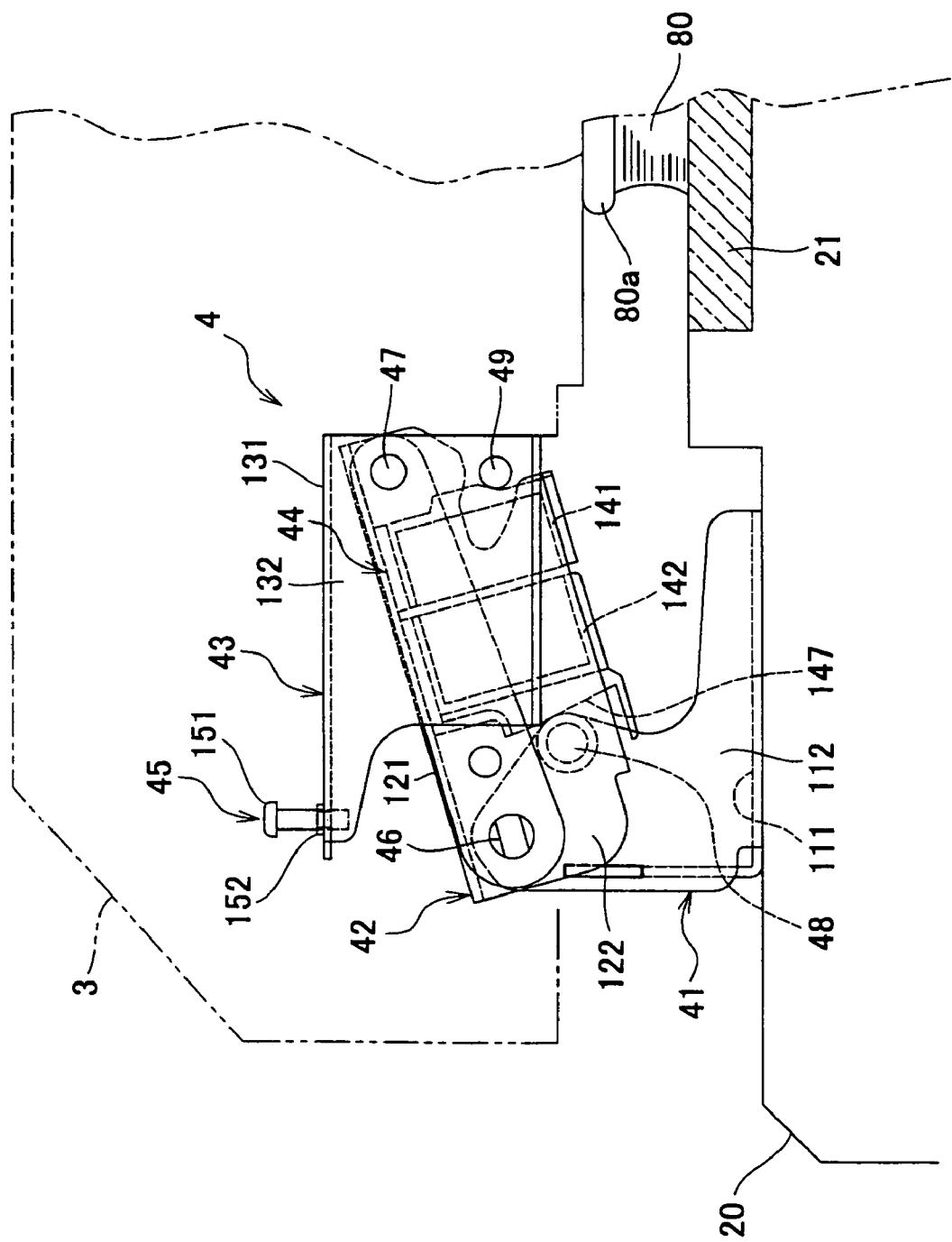
FIG. 7 is a side view showing an example of the hinge part relating to the present invention; .
Figure 8:
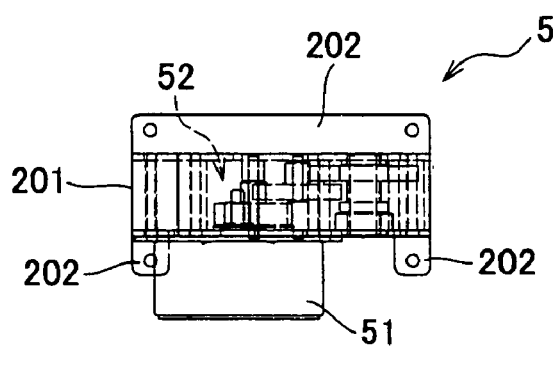
Figure 8:
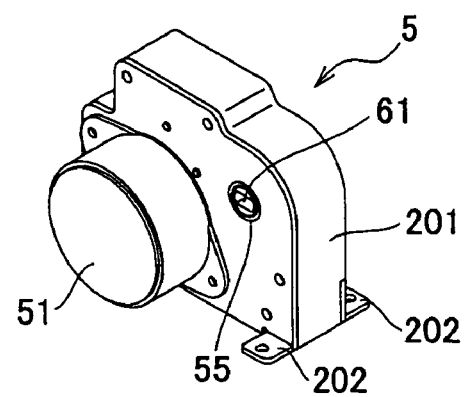
Figure 8:
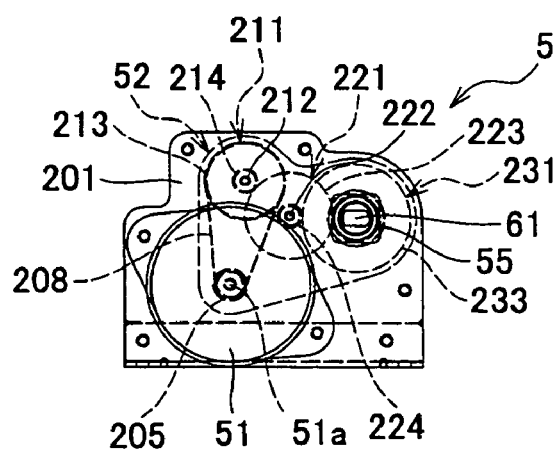
Figure 8:
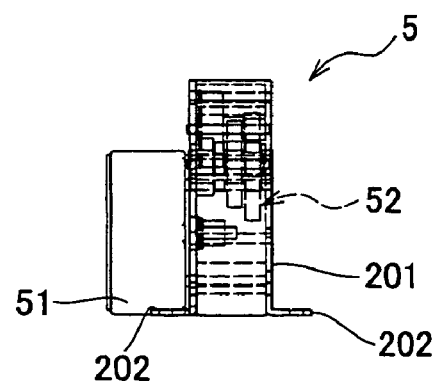

In a case that the original is as thick as a book as shown in FIG. 7, when the original cover 3 is rotated in the direction of closing (shifting downward), a portion near the supporting member 42 of the original cover 3 comes in contact with an end portion 80a on the supporting member 42 side of the original 80, or in the vicinity thereof to form a space between an end on the opposite side of the end portion on the supporting member 42 side of the original 80 and the original cover 3. In other words, the original cover 3 on the end on the gripping part side becomes a levitated state. When, for instance, near the end portion of the levitated original cover 3 on the gripping part side is pressed toward the contact glass 21 side, the operation pin 49 pushes the first slider 141 toward the second slider 142 side, which makes the first slider 141 shift on the second slider 142 side opposing the urging force of the compression coil spring so that the original cover 3 rotates around the hinge pin 47. In other words, the original cover 3 shifts to cover the upper portion of the original 80. For instance, when the upper portion of the original 80 is flat, the original cover 3 comes into surface contact with the upper portion. Thus, the thick original 80 stably comes into intimate contact with the surface of the contact glass 21.

When the original cover 3 is automatically rotated in the direction of closing, the automatic close switch 26 for the original cover performs, for instance, pushing manipulation. By the manipulation of the automatic close switch 26 for the original cover, the pulse motor 51 is driven to rotate in the opposite direction to the opening direction. The rotary driving power of the pulse motor 51 is transferred to the drive shaft 55 via the power transferring mechanism 52 and transferred from the drive shaft 55 to the rotary shaft 46 so that the original cover 3 in the opening position automatically rotates in the direction of closing.

In the case that the first automatic rotary closing function is provided in the controller 23, when the original cover 3 which automatically rotates in the direction of closing reaches a prescribed angle of, for instance, 15° (including around 15°) or less, the pulse motor 51 stops driving, or transfer of the rotary driving power of the pulse motor 51 to the rotary shaft 46 is released due to activation of a clutch mechanism, so that rotating of the original cover 3 in the direction of closing is performed manually or by its weight. At this time, when a closing angle of the original cover 3 reaches, for instance, 10° (including around 10°), the rotating speed of the original cover 3 is reduced by the fluid damper device. As a result, since the rotating speed of the original cover 3 is controlled by the fluid damper device, the original cover 3 does not collide with the contact glass 21 vigorously. When the fluid damper device is not provided, by connecting the drive shaft 55 and the rotary shaft 46 so that the rotary power of the rotary shaft 46 is transferred to the power transferring mechanism, the pulse motor 51, and the like, the rotating speed of the original cover 3 is reduced. Therefore, the original cover 3 does not collide with the contact glass 21 vigorously.

In the case that the second automatic rotary closing fiction is provided in the controller 23, when the original cover 3 is rotated in the direction of closing by the manipulation of the automatic close switch 26 for the original cover, the original cover 3 rotates at low speed and comes in intimate contact with the main body 20. Thus, by rotating the original cover 3 at low speed, impact of the original cover 3 to the main body 20 is restrained, and the original cover 3 can be made in intimate contact with the main body 20 without levitation.

Accordingly, by connecting between the rotary shaft 46 of the hinge part 4 and the drive shaft 55 of the driving part 5, the rotary driving power of the pulse motor 51 is transferred from the drive shaft 55 to the rotary shaft 46, so that the automatic original cover closer 1 relating to the present invention is capable of automatically performing rotating of the original cover 3. As a result, rotation of the original cover 3 can be carried out with little modification of the structure of the hinge part 4. Namely, since rotation of the original cover 3 can be automatically carried out by using an existing hinge part 4, practical use of automatic opening and closing of the original cover 3 can be easily realized.

Since the horizontal position adjusting means 45 is provided on the lifting member 43, it becomes possible to adjust position of the original cover 3 in relation to the contact glass 21, which enables to come into intimate contact with the original more stably.

If a drive motor is the pulse motor 51, when a large torque different from a torque to rotate the original cover 3 is generated at the time of automatically rotating the original cover 3 in the direction of opening or closing, the pulse motor 51 gets out of order, which prevents damage of motors, the power transferring mechanism 52 or the like.

It should be noted that though the above embodiments according to the present invention are explained for the cases of using the second slider 142, the object of the present invention can be achieved even by replacing the second slider 142 to an well-known spring receiving member swingably mounted on an operating pin 49.

Furthermore, since the office equipment 2 relating to the present invention is provided with the aforementioned automatic original cover closer 1 relating to the present invention, by connecting the rotary shaft 46 of the hinge part 4 and the drive shaft 55 of the driving part 5 similarly to the above, the rotary driving power of the pulse motor 51 is transferred from the drive shaft 55 to the rotary shaft 46, which facilitates automatic rotation of the original cover 3. As a result, rotation of the original cover 3 can be automatically carried out with little modification of the hinge part 4. Namely, since rotation of the original cover 3 can be automatically carried out by using an existing hinge part 4, practical use of automatic opening and closing. of the original cover 3 can be easily realized As explained above, since the automatic original cover closer relating to the present invention can automatically carry out rotation of the original cover with little modification of structure of the hinge part by connecting the rotary shaft of the hinge part and the drive shaft of the driving part so that the rotary driving power of the drive motor can be transferred to the supporting member via the drive shaft and the rotary shaft, which facilitates practical use of automatic opening and closing of the original cover. Therefore, it is suitably used as an automatic original cover closer especially for a copying machine, a printer, a facsimile machine, a scanner, and so on, and is useful for the aged or a person on a wheel chair.

What is claimed is:

1. An automatic original cover closer for an automatic opening and closing of an original cover with respect to a main body of an office equipment, said automatic original cover closer comprising:

hinge parts and a driving part to transfer a driving power to the hinge parts;

said hinge parts comprising:

a mounting member having a bottom plate and two side plates extending from both side portions of the bottom plate upward in the orthogonal direction to the bottom plate respectively and attached said bottom plate to an upper portion of the main body; and a supporting member including a top plate and both side plates extending downward in a direction perpendicular to the top plate from both side portions of the top plate respectively, with said both side plates being axially supported via a rotary shaft on said both side plates of said mounting member so as to be rotatable with the rotary shaft;

said driving part comprising:

a drive case attached to said upper portion of the main body;

a positively and reversely rotatable drive motor attached to the drive case;

a drive shaft attached to said drive case so as to be rotatable; and a power transferring mechanism attached to said drive case for decelerating and transferring a rotary driving power of said drive motor to said drive shaft;

wherein said rotary shaft and said drive shaft are coaxially connected with each other in an axial direction, so that the rotary driving power of said drive motor is transferred to said supporting member via said drive shaft and said rotary shaft.

2. The automatic original cover closer according to claim 1, wherein, in coaxially connecting said rotary shaft and said drive shaft in the axial direction, either one of said rotary shaft and said drive shaft is formed in a deformed cylindrical shape so that the other shaft is inserted and fixed to the one shaft in the deformed cylindrical shape.

3. The automatic original cover closer according to claim 1, wherein said drive motor is a pulse motor.

4. The automatic original cover closer according to claim 1, wherein said hinge parts further comprise a lifting member having a top plate fixed to said original cover and two side plates extending downward from both end portions of the bottom plate in an orthogonal direction to the bottom plate respectively, with the side plates being axially supported on said side plates of said supporting member so as to be rotatable, and a resilient means to urge said lifting member in an opening direction of said original cover and said lifting member in a direction to be overlapped on said supporting member.

5. The automatic original cover closer according to claim 1, wherein said driving part is further provided with an automatic rotary closing mechanism which automatically drives said drive motor, when the original cover is manually opened to a prescribed opening angle or less from a closed position.

6. The automatic original cover closer according to claim 1, wherein the driving part is further so adjusted that, in automatically closing said original cover in a closing direction by driving said drive motor, said drive motor is switched off at a prescribed closing angle or less, and the closing movement of the original cover is then carried out manually or by its own weight.

7. An office equipment including the automatic original cover closer according to claim 1.

* * * * *